(12) United States Patent (10) Patent No.: US 7,587,308 B2
Kasravi et al. (45) Date of Patent: Sep. 8, 2009

(54) WORD RECOGNITION USING ONTOLOGIES

(75) Inventors: Kas Kasravi, W. Bloomfiled, MI (US);
Maria Risov, Bloomfield Hills, MI (US); Sundar Varadarajan, Beaverton, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 513 days.

(21) Appl. No.: 11/285,090

(22) Filed: Nov. 21, 2005

(65) Prior Publication Data

US 2007/0118357 A1 May 24, 2007

(51) Int. Cl.
*G06K 9/72* (2006.01)
*G06F 17/27* (2006.01)

(52) U.S. Cl. .......................................... 704/9; 382/229
(58) Field of Classification Search ........................ None
See application file for complete search history.

(56) References Cited

U.S. PATENT DOCUMENTS

| | | | | |
|---|---|---|---|---|
| 3,988,715 | A * | 10/1976 | Mullan et al. ................ | 382/228 |
| 5,754,695 | A * | 5/1998 | Kuo et al. .................... | 382/228 |
| 5,878,406 | A | 3/1999 | Noyes | |
| 6,163,785 | A | 12/2000 | Carbonell et al. | |
| 6,487,556 | B1 | 11/2002 | Downs et al. | |
| 6,879,956 | B1 * | 4/2005 | Honda et al. ................ | 704/244 |
| 7,085,750 | B2 | 8/2006 | Kasravi et al. | |
| 7,302,383 | B2 * | 11/2007 | Valles ............................ | 704/9 |
| 2002/0059289 | A1 * | 5/2002 | Wenegrat et al. ............ | 707/102 |
| 2003/0233230 | A1 * | 12/2003 | Ammicht et al. ............ | 704/235 |
| 2004/0249829 | A1 | 12/2004 | Kasravi | |
| 2005/0049852 | A1 * | 3/2005 | Chao .............................. | 704/9 |
| 2005/0165600 | A1 | 7/2005 | Kasravi et al. | |

FOREIGN PATENT DOCUMENTS

WO  WO 00/29980  5/2000

OTHER PUBLICATIONS

Gurevych et al., "Semantic coherence scoring using an ontology", Proceedings of the 2003 Conference of the North American Chapter of the Association for Computational Linguistics on Human Language Technology, vol. 1, pp. 9-16, 2003.*

(Continued)

*Primary Examiner*—David R Hudspeth
*Assistant Examiner*—Brian L Albertalli

(57) ABSTRACT

Systems, and associated apparatus, methods, or computer program products, may use ontologies to provide improved word recognition. The ontologies may be applied in word recognition processes to resolve ambiguities in language elements (e.g., words) where the values of some of the characters in the language elements are uncertain. Implementations of the method may use an ontology to resolve ambiguities in an input string of characters, for example. In some implementations, the input string may be received from a language conversion source such as, for example, an optical character recognition (OCR) device that generates a string of characters in electronic form from visible character images, or a voice recognition (VR) device that generates a string of characters in electronic form from speech input. Some implementations may process the generated character strings by using an ontology in combination with syntactic and/or grammatical analysis engines to further improve word recognition accuracy.

23 Claims, 5 Drawing Sheets

OTHER PUBLICATIONS

Guzman et al., "Finding the Most Similar Concepts in Two Different Ontologies", Lecture Notes in Computing Science, MICAI 2004: Advances in Artificial Intelligence, vol. 2972/2004, pp. 129-138, Mar. 2004.*

Porzel et al., "A Task-based Approach for Ontology Evaluation", In: Proc. of the ECAI Workshop on Ontology Learning and Population, 2004.*

Daconta, et al., *The Semantic Web*, "The Semantic Web: A Guide to the Future of XML, Web Services, and Knowledge Management," Chapter 8, (2003) (Modified Mar. 24, 2004) (42 pages).

Jeong et al., "Using Higher-level Linguistic Knowledge for Speech Recognition Error Correction in a Spoken Q/A Dialog," downloaded from http://www.research.att.com/~dtur/NAACL04-Workshop/ on May 7, 2001 (8 pages).

"Building Parse Trees," downloaded from http://www.cs.sunysb.edu/~warren/xsbbook/node28.html, on Aug. 31, 2005 (3 pages).

M. Jeong, et al., "Semantic-oriented error correction for spoken query processing," Automatic Speech Recognition and Understanding, Nov. 30, 2003, IEEE, pp. 156-161.

A. Maedschi and S. Staab, "Ontology Learning," Handbook of Ontologies in Information Systems, 2004, pp. 1-18.

International Search Report, PCT/US2006/036497; Mar. 14, 2007, 2 pages.

Ayres, "The Functional Data Model as the Basis for an Enriched Database Query Language," *J. Intelligent Information Systems*, 1999, 12(2):139-164.

Azmoodeh, "BRMQ: A Database Interface Facility based on Graph Traversals and Extended Relationships on Groups of Entities," *Computer Journal*, 1990, 33:31-39.

Chen et al., "COPLINK: Information and Knowledge Management for Law Enforcement," *Proceedings of SPIE*, 2000, 4232:293-304.

Griffith, "Three Principles of Representation for Semantic Networks," *ACM Transactions on Database Systems*, 1982, 7(3):417-442.

Horn et al., "Link Discovery Tool," *ONDCP/CTAC International Symposium*, 1997, pp. 1-5.

Hsieh, "A Logic to Unify Semantic Network Knowledge Systems with Object-Oriented Database Models," *System Sciences*, 1992, pp. 347-358.

International Search Report, PCT/US2004/009077, Nov. 8, 2004, pp. 1-5.

Papazoglou, "Unraveling the Semantics of Conceptual Schemas," *Communications of the ACM*, 1995, 38(9):80-94.

Schnase et al., "Semantic Data Modeling of Hypermedia Associations," *ACM Transactions on Information Systems*, 1993, 11(1):27-50.

Su et al., "Heuristic Algorithms for Path Determination in a Semantic Network," Computer Software and Applications, 1990, pp. 587-592.

International Search Report and Written Opinion, PCT/US2006/036497, Mar. 26, 2007, 12 pages.

* cited by examiner

WORD RECOGNITION USING ONTOLOGIES

TECHNICAL FIELD

This disclosure relates generally to computational linguistics and, in particular implementations, to word recognition.

BACKGROUND

Languages enable efficient, high quality communication. People, for example, use language to communicate ideas. Even computers use language to interpret information in the form of program instructions. Languages are typically based on a vocabulary and a grammar. Many modern languages are capable of verbal (i.e., oral) expression, whereby a human voice may carry speech. Examples of verbal expressions of language are evident, for example, in radio broadcasts, audio books, and everyday dialogue. Many languages are also capable of written expression, whereby characters are tangibly embodied in a medium. Examples of written expressions of language include books, newspapers, and legal documents.

Whether expressed in verbal or written form, languages typically include a vocabulary to represent ideas or concepts. A vocabulary may include all the words of a language, or all words that may be used by or understood by a particular group.

Although there may be many exceptions, languages typically employ a set of rules, or a grammar, to structure the vocabulary into organized patterns. Grammar may provide structural relationships in a language, including a system of rules for generating all sentences possible in a language.

In addition to vocabulary and grammar, expressions of language may be understood from the perspective of semantics. In general, semantics may relate to the meaning that is conveyed by language, which may be shaped in large measure by the context in which an idea is expressed. For example, "row" may be understood as a verb in the context of a small boat, but be understood as a noun with a very different meaning in the context of a table in a spreadsheet. Whether communicated in verbal or written form, semantic analysis may be important to understanding the intended meaning of the word "row." For example, verbal expressions of homonyms, like "way" and "weigh," may be indistinguishable without reference to the context in which they are used.

SUMMARY

Systems, and associated apparatus, methods, or computer program products, may use ontologies to provide improved word recognition. The ontoLogies may be applied in word recognition processes to resolve ambiguities in language elements (e.g., words) where the values of some of the characters in the language elements are uncertain. Implementations of the method may use an ontology to resolve ambiguities in an input string of characters, for example. In some implementations, the input string may be received from a language conversion source such as, for example, an optical character recognition (OCR) device that generates a string of characters in electronic form from visible character images, or a voice recognition (VR) device that generates a string of characters in electronic form from speech input. Some implementations may process the generated character strings by using an ontology in combination with syntactic and/or grammatical analysis engines to further improve word recognition accuracy.

In an illustrative example, a most likely value for a character (e.g., alphanumeric character) in a converted word is selected so that the converted word makes sense in the context of other words in the same phrase, sentence, paragraph, or discourse. The most likely value may be selected by performing an analysis according a predetermined ontology. An ontology may include a linked collection of words, concepts, or issues that relate to the environment or domain that pertains to the phrase, sentence, paragraph, or discourse. The predetermined ontology may define relationships among a number of language elements that are likely to be used, for example, in a particular context, and/or are related to particular subject matter. In this illustrative example, a VR or OCR device may output a string of ASCII characters, representing a sentence, to be converted into recognized words.

Some implementations may provide one or more advantages. For example, the system may provide for improved accuracy in resolving ambiguous character strings to text. Some implementations may reduce the number of errors associated with VR or OCR devices, thereby promoting their broad adoption. Such implementations may be used to provide more reliable products or services for disabled individuals, such as those who have visual or auditory impairments, and who may benefit from more accurate word recognition in VR and/or OCR technologies. Improved word recognition may promote broader use of text-searchable documents by reducing the occurrence of word recognition errors.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
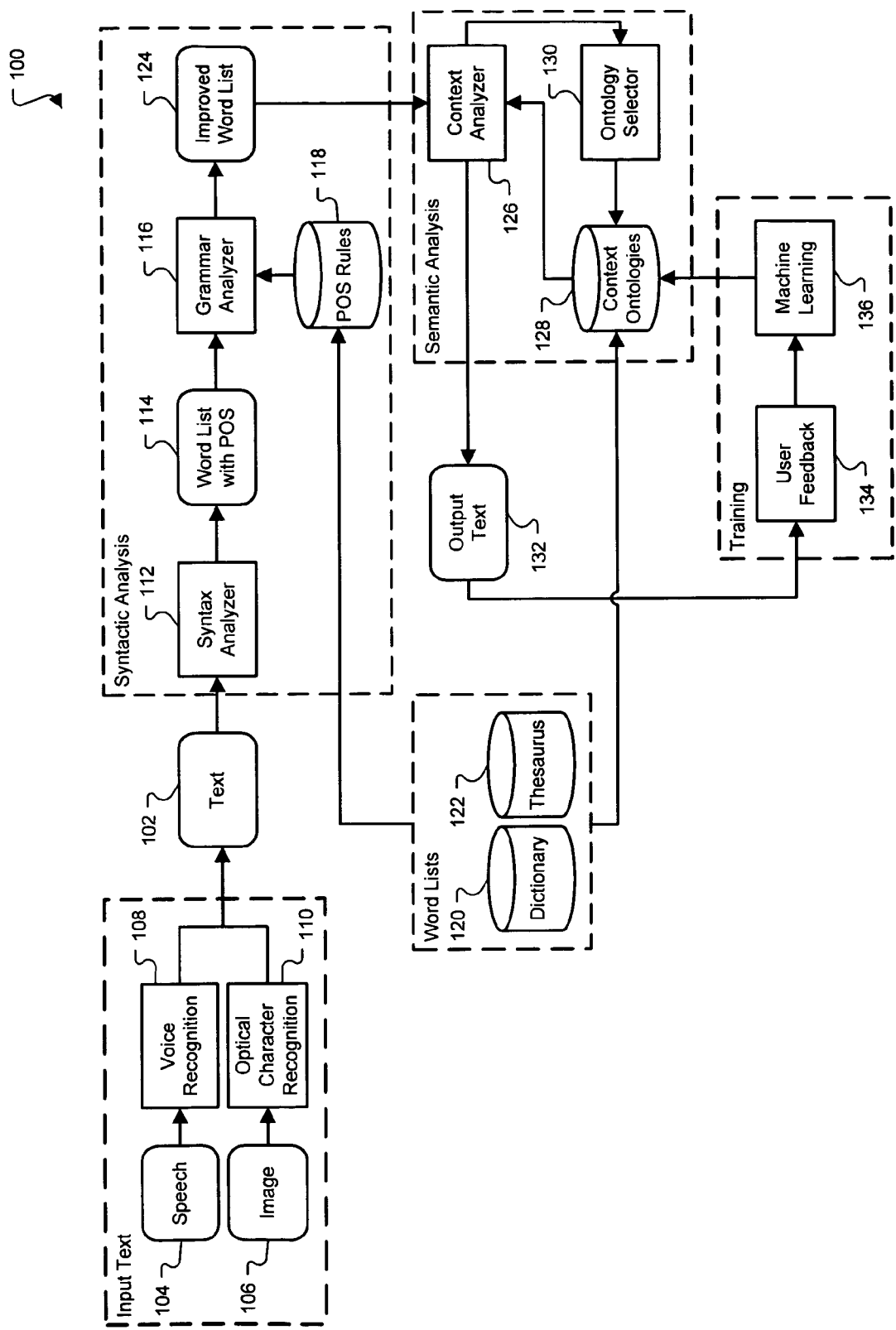
FIG. 1 is a functional block diagram that includes a system for using ontologies to recognize words.

FIG. 1 shows an exemplary system 100 for converting verbal or written expressions of language into electronically stored language elements. In some implementations, the conversion includes applying semantic analysis according to an ontology that is appropriate for the context in the expression. To address some uncertainties in the conversion process, the system 100 features elements for reducing some ambiguities in the values assigned to language elements that are stored electronically. The system 100 may be configured to apply a domain ontology and a semantic analysis to more accurately identify language elements (e.g., words) of high ambiguity. The language elements may include, for example, alphanumeric characters, words, phrases, sentences, or other meaningful utterances.

The system 100 receives an input text 102, which may contain ambiguous language elements. The input text 102 may undergo a syntactic analysis followed by a semantic analysis to generate an output text 132 that may have reduced ambiguity. In this example, the syntactic analysis is performed by a syntax analyzer 112 and a grammar analyzer 116 that is coupled to access a part-of-speech (POS) rules database 118. The syntax analyzer 112 compiles a word list with POS 114, which the grammar analyzer 116 processes into an improved word list 124. The improved word list 124 undergoes semantic analysis processing by a context analyzer 126 in cooperation with an ontology selector 130 that is coupled to a context ontology database 128.

In this example, the system 100 further includes a capability for manually, automatically, and/or adaptively defining ontology relationships. This relationship defining capability may be performed by a user feedback module 134 and/or a machine learning module 136 processing information contained in the output text 132, for example. The modules 134, 136 feed relationship-defining information back to the context ontology database 128. In various implementations, this adaptation may be performed on-line and/or off-line.

In some implementations, the system may operate as follows. The input text 102 may contain information in electronic form and/or signals that represent a number of characters (i.e., a string of characters). The character string may correspond to a sequence of words. In some cases, the sequence may include one or more ambiguous words in which the values of some characters are uncertain, and/or have less than a threshold level of certainty, for example. The system 100 may perform an analysis on the words in the received character string according to an ontology that defines relationships among a number of words, or other language elements. By identifying matches between words in the ontology and words in the received character string, the context analyzer 126 may be able to identify the most likely value for one or more of the ambiguous words in the input text 102. The context analyzer 126 may then assign the identified most likely values to the respective uncertain words to generate the output text 132.

In the exemplary system 100, the input text 102 may be derived from speech information 104 and/or character image information 106 that have been processed by a voice recognition module 108 or an optical character recognition module 110, respectively. The speech information 104 or character image information 106 may be in a physical form (e.g., sound pressure vibrations, a visual display), or in an electronic form, such as an analog (i.e., continuous time) recording, or in a digitally sampled form. In some examples, the information 104, 106 may be derived from a radio, television, or satellite broadcasts, or from a telephone conversation, microphone, video image capture device (e.g., video camera), or the like. The information 104, 106 may be received in real-time, or stored in an electronic storage media (i.e., data storage device), such as volatile and/or non-volatile memory, for example. In some implementations, the speech information 104 may be formatted in an audio format, such as, for example, Wave Form Audio format (WAV) or Moving Pictures Experts Group Audio Layer 3 format (MP 3). In some implementations, the character image information 106 may be formatted using, for example, Joint Photographic Experts Group format (JPEG) or the Tagged Image File Format (TIFF).

The process of converting written or verbal expressions to electronic strings of characters can involve some uncertainty in the resulting character string. For example, the speech information 104 and character image information 106 may be inputs that are not perfectly recognizable. Accordingly, the recognition modules 108, 110 may employ various algorithms, resolution levels, and processing times to optimize the recognition quality against the processing time to perform the conversion. However, in some cases, some of the input speech or written language may not be recognized with a high degree of certainty. The accuracy of the conversion from these language inputs to electronically stored characters depends on the quality of both the input language information and the conversion processes in the recognition module. To the degree that the conversion performed by the recognition module is imperfect, the value assigned to the electronic characters can be uncertain. If one or more characters in a converted character string have uncertain values, then some words in the text 102 may be ambiguous.

To quantify the degree of uncertainty associated with the converted characters (or other language elements), the recognition modules 108, 110 may, in some implementations, associate confidence levels with some or all language elements in the input text 102. The confidence level associated with a particular language element may indicate the degree of uncertainty in the converted value of the electronic language element, which may be a character (i.e., letter, number), group of characters (e.g., "sh," "ch," "th"), or other language component (e.g., phrase) in the text 102. As such, the confidence levels may indicate to what degree the conversion is likely to correctly represent the expression of the language input information 104, 106. In one implementation, confidence levels may be expressed, for example, as a percentage (i.e., 0%-100%). In other examples, language elements (e.g., characters) of the text 102 may be associated with other quantitative indicia that represent the degree of confidence in the values of the characters determined by either or both of the recognition modules 108, 110. Recognition modules may also use multiple probability indicia to represent the likelihood of the accuracy of a word, or use symbolic labels such as "Low," "Medium," and "High" to accomplish the same. Confidence ranges may also be represented via functions that are dependent on other domain parameters; for example, Confidence=0.0.5 * Frequency^2 for a telephone conversation, and Confidence=0.08 * Frequency^2 for a CD recording, where the confidence is influenced by a combination of high pitch and the medium (phone v. CD).

For purposes of clearly describing various aspects and operations, the system 100 will be described with reference to the following exemplary character string, which may be included in an exemplary input text 102:

The ?at ate ?he ?at.

The question marks ("?") indicate Language elements, which may include one or more characters, that are associated with a relatively low confidence level. In this illustrative example, the character string is only partially recognized. Specifically, the second, fourth, and fifth words include values that are sufficiently uncertain that those words may be considered to be ambiguous. Furthermore, the VR module 108 is subject to incorrect interpretations of words that have substantially identical sounds (i.e., homonyms) but are otherwise unambiguous. For example, the third word, "ate," has a homonym "eight" that has a substantially identical phonetic form, but conveys a substantially different meaning.

According to the example, the syntax analyzer module 112 may receive the exemplary input text 102. In general, the input text 102 may be symbolically represented by the following:

$$T=\{W_1+W_2+\ldots W_n\}$$

$$W_i=\{(w_{i1}, C_{i1}), (w_{i2}, C_{i2}), \ldots (w_{im}, C_{im})\}.$$

Where T represents the input text 102, $W_k$ is the $k^{th}$ token of a word vector (e.g., sentence) in the text 102, $w_{ih}$ is the $h^{th}$ possible alternate of a word (e.g., cat, sat, bat, fat, and eat for "?at"), and $C_{ih}$ is the confidence level associated with the $h^{th}$ alternate. In some implementations, the syntax analyzer module 112 may operate on one word vector at a time, for example, to generate a set of possible word sequences that represent potentially grammatically sound sentences. In the exemplary sentence, there are multiple points of imprecision and/or ambiguity. Accordingly, the syntax analyzer 112 may identify a list of alternate words, or "word lists," for each of the ambiguous words in the exemplary sentence, as indicated in Table 1.

TABLE 1

| The | ?at | ate  | ?he | ?at |
|-----|-----|------|-----|-----|
| The | cat | eight| she | fat |
|     | sat | ate  | the | rat |
|     | bat |      |     | sat |
|     | fat |      |     |     |
|     | eat |      |     |     |

The syntax analyzer module 112 may identify for each alternate word any possible part-of-speech (POS), and a corresponding probability value to indicate the degree of certainty (or uncertainty) for each identified POS.

Based on the input text 102, the corresponding confidence levels, and the alternate words in the word lists, the syntax analyzer 112 may assign probabilities that a particular word in one of the word lists is of a particular part of speech, such as a noun, a verb, or an adjective. The syntax analyzer module 112 may generate the word list with POS 114, which may be symbolically represented by the following:

$L=\{S_1+S_2+\ldots S_n\}$ $S_i=\{(w_{i1}, Q_{i1}), (w_{i2}, Q_{i2}), \ldots (w_{im}, Q_{im})\}$.

Where L is the word list with POS 114, $S_i$ represents a sentence, $w_{ij}$ is a word in position j, and $Q_{ij}$ contains probabilities that the word in position j is of a particular part of speech. For example, in the word list for "?at" ($1^{st}$ occurrence) shown below in Table 2, the language element "cat" may have a 90% probability of being a noun and a 10% probability of being a verb. Table 2 also shows the confidence levels, which may have been provided by the recognition module (as described above).

TABLE 2

| ?at | Confid. Level | POS       | Probability |
|-----|---------------|-----------|-------------|
| cat | 0.35          | noun      | 0.9         |
|     |               | verb      | 0.1         |
| sat | 0.20          | noun      | 0.2         |
|     |               | verb      | 0.8         |
| bat | 0.05          | noun      | 0.7         |
|     |               | verb      | 0.3         |
| fat | 0.05          | noun      | 0.4         |
|     |               | adjective | 0.6         |
| eat | 0.35          | verb      | 1.0         |

In the system 100 of FIG. 1, the syntactic analysis of the syntax analyzer 112 is followed by the grammatical analysis of the grammar analyzer 116. Some additional details of an implementation of the grammar analyzer 116 are described below with reference to FIG. 3. In other implementations, the grammatical analysis need not follow the analysis performed by the syntax analyzer 112.

The grammar analyzer 116 may receive the word list with POS 114, and apply the part-of-speech rules 118 in connection with a predetermined or a selected grammar to verify the syntactic soundness of the word list with POS 114. In some implementations, the part-of-speech rules 118 may access information contained in an electronic dictionary 120 and/or an electronic thesaurus 122 regarding possible part-of-speech interpretations of each language element in the word list.

The grammar analyzer 116 may be configured to use a context free grammar, such as the Cocke-Younger-Kasami (CYK) or Earley's algorithms, which may include rules such as in Table 3.

TABLE 3

| Component   | Allowed Sub-Components         |
|-------------|--------------------------------|
| Sentence    | Noun Phrase + Verb Phrase      |
| Noun Phrase | Determiner + Adjective + Noun  |
| Noun Phrase | Determiner + Noun              |
| Noun Phrase | Adjective + Noun               |
| Verb Phrase | Verb + Noun Phrase             |

Figure 3:
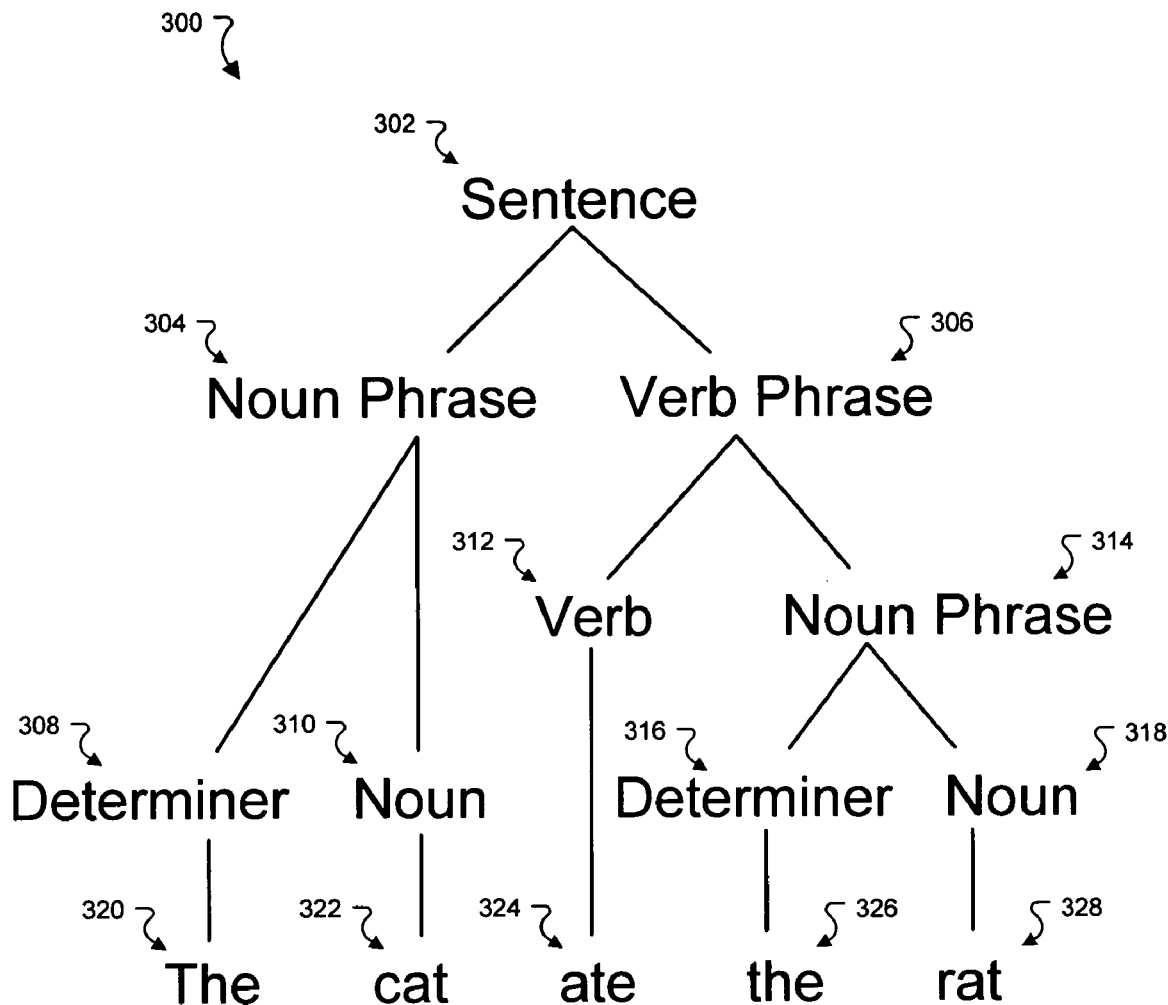
FIG. 3 is a schematic representation of an exemplary syntax analysis.

As will be described in detail with reference to FIG. 3, the grammar analyzer 116 may determine that the exemplary sentence has the following form:

Determiner+Noun+Verb+Determiner+Noun.

Because the sentence has an acceptable form under the grammar rules of Table 3, it is included in the improved word list 124. In embodiments, if the input is not grammatically recognized, then it may be discarded. In some examples, words or language elements from Table 1 that would not form grammatically acceptable sentences may be removed from further consideration. In some examples, the score associated with such words or sequences of words may be adjusted based on this determination. In the illustrative example as indicated in Table 2, the low probability of "eat" being a noun, "eight" being a verb, and "she" being a determiner, these language elements may be effectively eliminated from further consideration. Accordingly, the grammar analyzer 116 may output the improved word list 124, as shown in Table 4.

TABLE 4

| The | ?at | ate | ?he | ?at |
|-----|-----|-----|-----|-----|
| The | cat | ate | the | fat |
|     | sat |     |     | rat |
|     | bat |     |     | sat |
|     | fat |     |     |     |

Semantic analysis may be performed on the improved word list 124 by the context analyzer 126. Based on the semantic analysis, the context analyzer may score the words in the improved word list 124, for example, by assigning a score to each word. The score may be used as a basis for inferring a most likely meaning from a context ontology selected from the context ontology database 128.

In some implementations, the context ontology database 128 may store one or more ontologies. For example, the context ontology database may contain, or otherwise have access to, predetermined ontologies, such as an automotive ontology, a sales and marketing ontology, and/or a zoological ontology. in various embodiments, ontologies have nodes connected by links that are meaningful in a selected domain. Domains in which a context ontology may be defined include, for example, the context of credit card applications in the banking industry, or quality control assessments in a particular manufacturing (e.g., automotive) or service (e.g., travel) context.

In one implementation, the improved word list 124 may first be examined to identify keywords that may be useful for selecting a ontology. The ontology selector 130 may use the identified keywords to select at least one candidate ontology from the context ontology database 128.

Using a selected ontology, the context analyzer 126 may score the candidate words individually (i.e., each word in the improved word list 124) and/or in groups. For example, the context analyzer 126 may determine a composite score for a sequence of words (e.g., a sentence) that contains more than one ambiguous word.

In various implementations, the score may be determined by applying functions of one or more criteria, and the criteria may be combined according to linear and/or non-linear relationships (e.g., additive, multiplicative, exponential, logarithmic, case-based logic). Each score may be a function of criteria including, for example, the number and/or degree (e.g., proximity) of matches between nodes in the selected ontology and the words in the improved word list 124. Another factor that may be accounted for in the scoring is the relatedness or proximity in the input text 102 of the ambiguous word to other words in the sentence that match nodes in the ontology. In some examples, a particular match that may be identified between two words in a sentence and corresponding matching nodes in an ontology may be highly relevant, such as if the two words in the sentence are closely coupled in meaning. In other examples, however, two unrelated words in a sentence may happen to match nodes defined in an ontology, but not in a meaningful way. As such, factors such as proximity between words in the input text 102 and coupling between such words may be applied to adjust a score.

Scoring functions may depend on other factors, such as the confidence level information associated with characters, or other language elements, in the text 102, for example. In some implementations, the scores may be functions of weights that are associated with links between nodes of interest in an ontology. The probabilities associated with possible parts-of-speech, as discussed with reference to Table 2, for example, may influence scoring. As mentioned elsewhere herein, the results of the grammatical analysis may be applied to adjust the scores. In some implementations, the score may be a function of weights that may be assigned to grammar rules, such as those defined in Table 3. Important grammar rules are assigned relatively heavy weights, less important grammar rules are assigned relatively light weights.

The context analyzer 126 may select the highest scoring word or sequence of words to replace an ambiguous word in the text 102 with a candidate word (or sequence of words) that is identified as having the highest score. After substituting the ambiguous words in the text 102 with the high scoring words, the context analyzer 126 may output the output text 132. In implementations, the output text 132 may be stored in a memory location, saved in an electronic document, and/or sent for display on a display device.

In implementations, the scoring may be performed on candidate words that are generated by processes that differ from those described above to generate the improved word list 124. For example, a List of candidate words may not have been analyzed by the grammar analyzer 116.

In various implementations, the ontology selector 130 may use one or more techniques, such as neural networks, case-based reasoning, or hash tables, to select appropriate context ontoLogies. If more than one ontology is determined to be appropriate, then, in one example, each candidate ontology may be applied in turn to score the candidate words in the improved word list 124. In one implementation, scores resulting from each candidate ontology may be compared on an individual or an aggregate basis to identify which candidate ontology is the best match to the improved word list 124. The ontology with the best match may be selected as the ontology from which the highest scoring words or sequence of words may be selected to generate the output text 132.

In some implementations, the context analyzer 126 may use other (e.g., non-textual) information to generate scores. Non-textual speech information 104 may include, for example, pitch, speed, and/or amplitude. Non-textual image information 106 may include, for example, font type, character size, boldface, italics, color, and/or underlining. Such non-textual information may be used to score and/or to select candidate language elements. Context analyzer 126 may use functions, heuristics, or other techniques to compute the score.

For example, the pitch and speed of the speech information 104 may be considered by the ontology selector 130 to select appropriate ontologies. Specifically, a high pitch and fast speed may indicate an excited or rushed context (e.g., an emergency or high tension context), whereas a low pitch and normal speed may indicate a more relaxed discourse.

Such non-textual information may be defined to be associated with links or nodes in an ontology. The context analyzer 126 may then use such non-textual information in scoring candidate words. By accounting for non-textual information, the accuracy of the word recognition process may be further improved.

The system 100 of FIG. 1 further includes the user feedback module 134 and/or the machine Learning module 136, which provide features to define (i.e., build, update, or edit) an ontology during on-line and/or off-line operations. In addition, these feedback modules 134, 136 may also provide information that can be used by the ontology selector 130 to more accurately select an ontology for a given input text 102. For example, in response to the output text 132, a user may provide information to update one or more ontologies via the user feedback module 134. In some implementations, the machine learning module 136 may provide information to improve ontology selection based on historical (i.e., past performance) data. The machine learning module 136 may use any appropriate machine learning method based on user feedback. For example, case-based reasoning, neural nets, or rules/heuristics may be implemented to direct the user feedback 134 into a representation that improves the performance of the context ontologies 128.

The user feedback module 134 may be coupled to a user interface to send information to a user or a database maintainer (e.g., a context expert) to indicate the current status of a particular ontology, such as the ontology that is currently or most recently active. The user feedback module 134 may also be operably coupled to a user interface configured to receive user input (e.g., via keyboard or voice command). The user input may define new information for use in an ontology, such as a new link and/or a new node. The user input may include corrective feedback information, for example, that is responsive to a scoring result generated by the context analyzer 126.

In some implementations, the corrective feedback may include information to adapt weights associated with specific links in an ontology. For example, confirming user feedback information may provoke the machine learning module 136 to increase weights associated with links that were significant in the scoring of a correct value for the output text 132. As another example, corrective user feedback information may provoke the machine learning module 136 to decrease weights associated with links that were significant in the scoring of an incorrect value for the output text 132.

Figure 2:
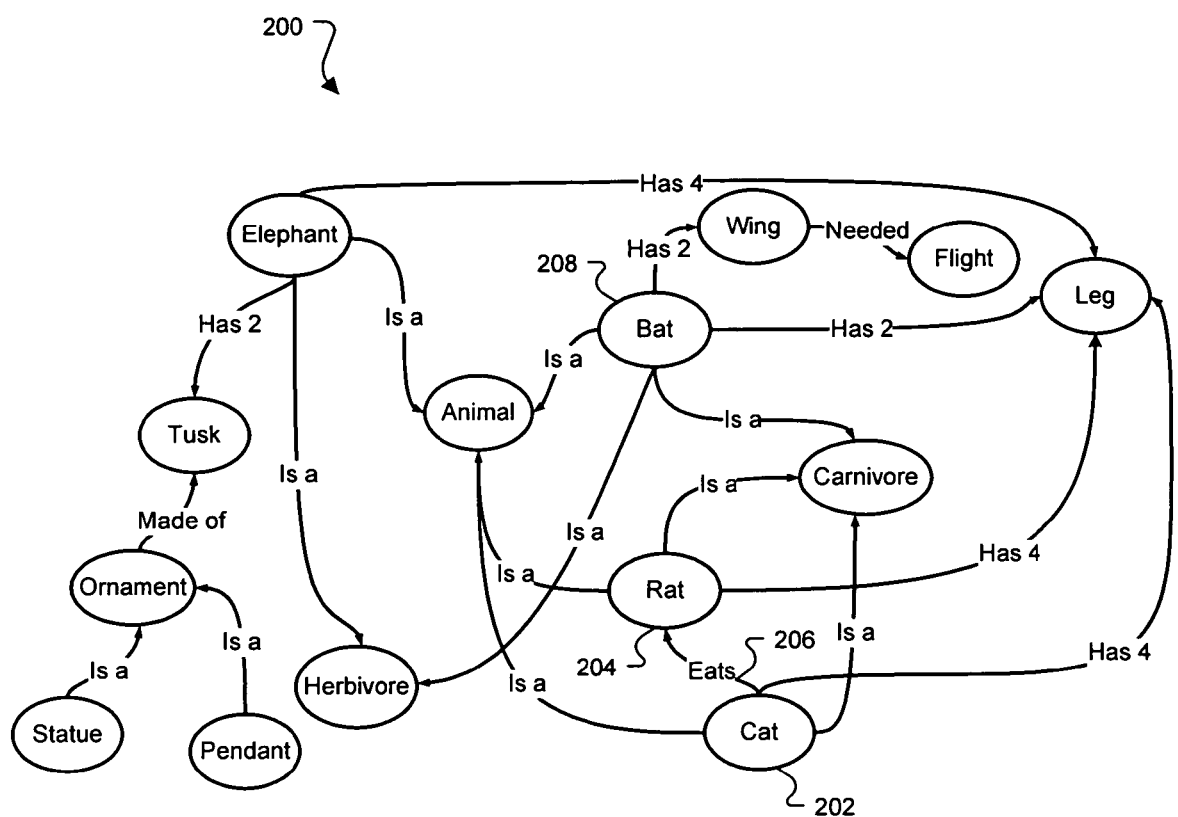
FIG. 2 is a schematic representation of an exemplary ontology.

The context analyzer 126 may process improved word lists 124 according to an exemplary ontology 200, which is schematically represented in FIG. 2. In this example, the ontology 200 pertains to zoological context, which is appropriate for the exemplary sentence discussed above. The ontology 200 includes concepts, represented as nodes, and relationships, represented as links between the nodes. In this example, the ontology 200 includes a "cat" node 202 that is related to a "rat" node 204 by a link 206. The link 206 represents the idea that cats sometimes eat rats.

The context analyzer 126 may, for example, process the improved word list 124 according to the ontology 200. In some implementations, the candidate words in the improved word list 124 may be scored based on the degree of relatedness between ambiguous elements in the input text 102 and nodes in the ontology 200. In one implementation, candidate words that do not appear in the ontology 200 may be eliminated from further consideration, or scores may be adjusted to reflect the degree of apparent relatedness. For example, the candidate language elements "sat" and "fat" do not exist in the zoological ontology 200 selected. Therefore, "sat" and "fat" (from Table 4) may be eliminated from further consideration, which results in the list shown in Table 5.

TABLE 5

| The | ?at | ate | ?he | ?at |
|---|---|---|---|---|
| The | cat bat | ate | the | rat |

Using the remaining List of language elements the two sentences shown in Table 6 may be formed.

TABLE 6

| The | ?at | ate | ?he | ?at |
|---|---|---|---|---|
| The | cat | ate | the | rat |
| The | bat | ate | the | rat |

In the ontology 200, the bat node 208 does not have a link to the rat node 204. Therefore, it is unlikely that "bat" is the correct candidate word. As such, the context analyzer 126 would assign a low score to the candidate word "bat," which indicates that it is not a likely candidate. However, the cat node 202 does have a direct link 206 to the rat node 204. Therefore, the context analyzer 126 would assign a high score to the candidate language element "cat," indicating that it is a likely candidate. The context analyzer 126 may output in the output text 132 the first sentence in Table 6, because it includes the most likely set of words according to the selected ontology 200.

As described above with reference to Table 3, the grammar analyzer 116 may be configured to use a context free grammar that includes a number of grammatical rules. Operations performed by the grammar analyzer 116 are next described in additional detail with reference to an exemplary parse tree 300, as shown in FIG. 3.

The grammar analyzer 116 may output one or more possible grammatically acceptable sentences in the improved word list 124. Associated with each of the sentences may be a corresponding parse tree.

The parse tree 300 may be used to describe the analysis of a possible sentence from the word list with POS 114. The grammar analyzer 116 may parse the words of the sentence according to their possible part-of-speech, which are summarized for one example in Table 2. If the words in the possible sentence are ordered so that their corresponding part-of-speech can be grouped in permissible ways according to the grammar rules in Table 3, then the possible sentence is considered to be a grammatically acceptable sentence.

The following example illustrates one implementation of the analysis that may be performed by the grammar analyzer 116 to generate the improved word list 124. In this example, the parse tree 300 represents a corresponding parse tree for one of the possible sentences that may be derived from the word list with POS 114 (Table 1): "The cat ate the rat." This possible sentence and an associated set of possible part-of-speech (see Table 2) are shown in Table 7.

TABLE 7

| The | ?at | ate | ?he | ?at |
|---|---|---|---|---|
| The determiner | cat noun | ate verb | the determiner | rat noun |

In this example, the parse tree 300 has at its root node a sentence 302 that takes the value of the possible sentence, i.e., "The cat ate the rat." According to the first rule in Table 3, the sentence 302 contains a noun phrase 304 and a verb phrase 306, which comports with the first rule in Table 3. The noun phrase 304 is divided into a determiner 308 and a noun 310, which complies with the third rule in Table 3. The verb phrase 306 is divided into a verb 312 and another noun phrase 314, which is in accord with the fifth rule in Table 3. The noun phrase 314 is also divided into a determiner 316 and a noun 318, which complies with the third rule in Table 3. The candidate words "The" 320, "cat" 322, "ate" 324, "the" 326, and "rat" 328, and their corresponding part-of-speech 308, 310, 316, 318, comply with the grammar rules defined in Table 3. Accordingly, for this set of part-of-speech, this possible sentence is grammatically acceptable.

Grammatically acceptable sentences (or other sequences of language elements) may be included in the improved word list 124. Some other possible sentences (or other sequence of language elements) may not qualify under the grammar rules defined in Table 3. For example, possible sentences from Table 1 that contain the candidate words "eat", "eight," and "she," do not comply with any of the grammar rules in Table 3. In some implementations, these possible sentences that are not grammatically acceptable are not included in the improved word list 124. In other implementations, a penalty may be applied to the scores determined by the context analyzer 126 for sentences that are not grammatically acceptable.

Figure 4:
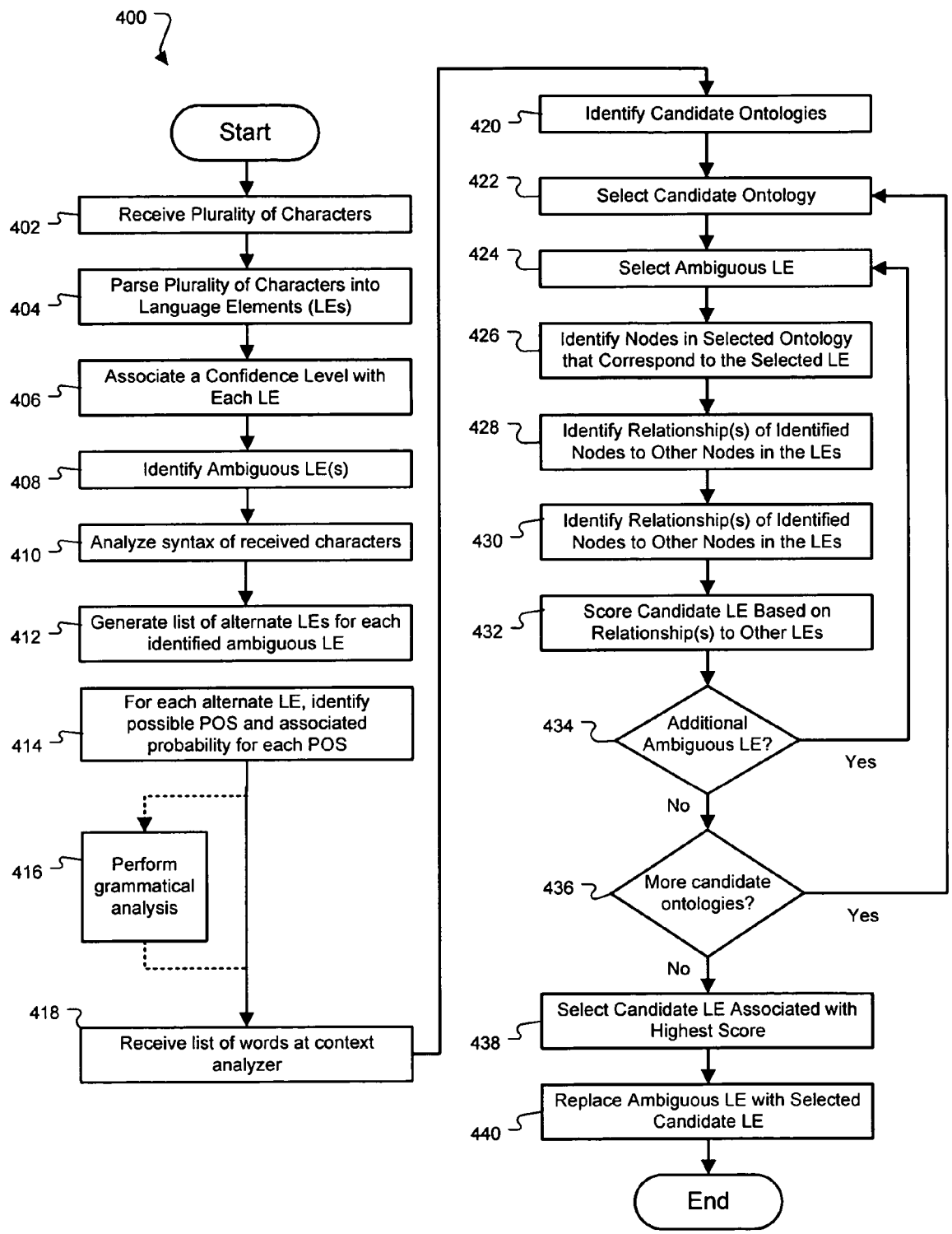
FIG. 4 is a flowchart of an exemplary method of recognizing words using an ontology.

FIG. 4 is a flow chart of an exemplary method 400 for reducing the ambiguities present in digitally stored characters that were converted from verbal or written language inputs, such as speech information 104 or image information 106. Implementations of the method 400 may be performed, for example, by the system 100. In some implementations, instructions tangibly embodied in an information carrier may be executed on a processor to perform portions of the method 400.

One implementation of the method 400 will be described with reference to the system 100 of FIG. 1. This is to more clearly describe the method. As such, other implementations of the method 400 may be performed by apparatus other than the system 100, and the system 100 may perform methods other than the method 400.

Beginning at 402, the system 100 receives a plurality of characters, such as a character string in the input text 102. In some implementations, other information, such as non-textual information, may be associated with the character string.

The character string is parsed at step 404 into language elements (LEs), which may be words, for example. At step 406, confidence levels may be associated with each parsed LE, for example, by multiplying or otherwise combining the confidence levels associated with each character in the LE. Ambiguous LEs are identified at step 408, for example, by comparing the confidence level of each LE or each character in the received string to various possible thresholds.

The syntax of the character string is analyzed, beginning at step 410, by the syntax analyzer 112. The syntax analyzer 112 may generate a list of alternate LEs for each identified ambiguous LE at step 412. For each generated alternate word, the syntax analyzer 112 may also identify one or more possible part-of-speech, and an associated probability for each possible part of speech, at step 414, to generate the word list with POS 114.

Some implementations may include the grammar analyzer 116 to perform a grammatical analysis step 416 that generates the improved word list 124. In general, the grammar analyzer 116 may employ techniques to filter out possible combinations of language elements that do not comply with a predetermined grammar, or set of grammar rules, such the part-of-speech rules 118. This grammatical analysis step may remove from further consideration possible sentences that would not be grammatically acceptable.

The context analyzer 126 receives a list of words at step 418, the list being generated either by the syntax analyzer 114 or by the grammar analyzer 116.

At step 420, candidate ontologies are identified. For example, the context analyzer 126 may provide keywords to the ontology selector 130. The ontology selector 130 may use the keywords to determine one or more candidate ontologies.

At step 422, the ontology selector 130 selects a candidate ontology and, at step 424, the context analyzer 126 selects one of the ambiguous language elements that was identified at step 408.

At step 426, the context analyzer 126 identifies nodes in the selected ontology that correspond to the selected ambiguous language element.

At step 428, the context analyzer 126 identifies relationships, or links, in the selected ontology between the identified nodes and other nodes in the ontology that correspond to other language elements in the character string. For example, the cat node 202, which corresponds to the ambiguous element "?at" ($1^{st}$ occurrence) has the relationship 206 with the rat node 204, which corresponds to the "?at" (second occurrence). The link 206 represents the relationship based on the fact that cats sometimes eat rats.

At step 430, the context analyzer 126 identifies candidate language elements that may replace the selected ambiguous language element. In this process, for example, the context analyzer may identify nodes in the selected ontology that might match based on the known (i.e., not uncertain) characters in the selected ambiguous word.

At step 432, the context analyzer 126 scores the identified candidate language elements. The score may be a function of one or more criteria, such as the number, arrangement, and/or strength of the links identified at step 428. For example, the context analyzer 126 may assign a high score to the language element "cat" because the cat node 202 has a direct relationship (i.e., separated by a single link) with another identified node, namely the rat node 204. The bat node 208 does not have a direct relationship with any of the identified nodes. Therefore, the context analyzer 126 may assign a low score to the language element "bat." Accordingly, the "bat" language element is a less likely candidate than the "cat" as a substitute for the "?at" language element in the text 102.

In some implementations, the score of a candidate language element may be determined by an equation. For example, the score may be determined by the directness of a candidate language element's relationship to another language element in the improved word list 114. A more direct relationship (i.e., one link of separation between nodes) may result in a higher score, which indicates a more likely candidate. In another example, each relationship is given a weight where stronger relationships have more weight than weaker relationships. The score of the individual relationship may be multiplied, for example, by its weight to determine an overall score for the candidate. The candidate's score may be a function of a combination of the weights of several series-connected links that connect the candidate language element to the second language element. Subsequent relationships between the two language elements may reduce the score of the candidate. Multiple chains of links from a node to multiple related nodes may be aggregated to yield a higher score. In some implementations, certain additional links in a series of links connecting to a third language element included in the text 102 may increase the score of the candidate. The score of the candidate may also be a function of the confidence levels provided by the recognition modules 108, 110. For example, the score determined by the candidate's relationships to other language elements in the text 102 may be multiplied by its confidence level as determined by one of the recognition modules 108, 110.

At step 434, if more ambiguous language elements remain, then step 424 is repeated after selecting another ambiguous language element. Otherwise, if all identified ambiguous language elements have been evaluated, then, at step 436, the context analyzer 126 checks whether other identified candidate ontologies must still be evaluated. If other identified candidate ontologies must still be evaluated, then step 422 is repeated to select the next candidate ontology.

If all identified candidate ontologies have been evaluated, then, at step 438, the context analyzer 126 selects the candidate language elements with the highest scores. Finally, at step 440, the context analyzer 126 prepares to generate the output text 132 by replacing each ambiguous LE with the highest scoring candidate.

Figure 5:
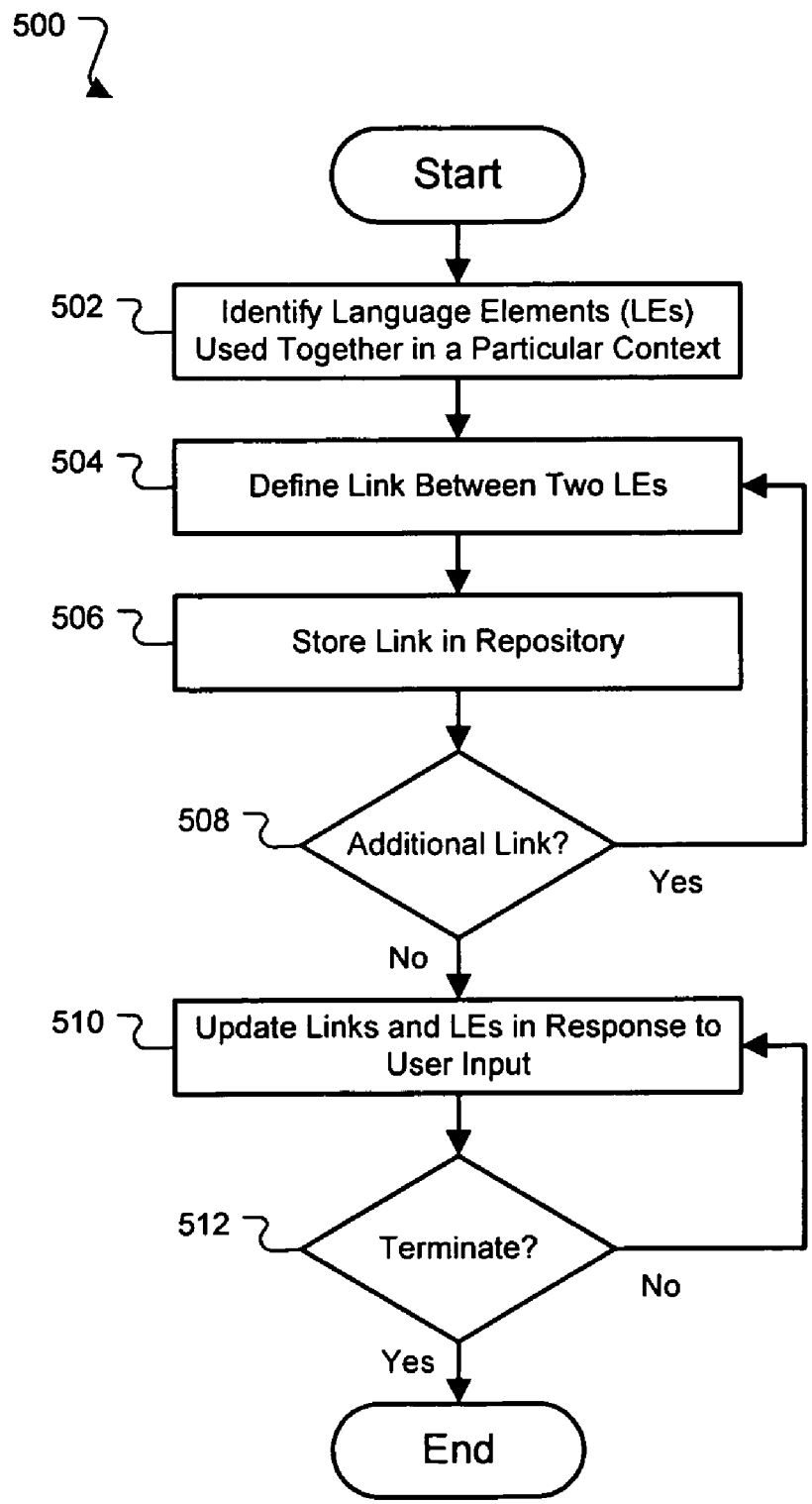
FIG. 5 is a flowchart of exemplary operations for creating and updating an ontology.

Relationships in an ontology, such as one stored in the context ontology database 128, may be defined by performing a set of operations according to an exemplary method 500, as illustrated in a flowchart in FIG. 5. For example, the method 500 may be performed by the user feedback module 134 and the machine learning module 136 to define nodes and links in the context ontology database 128. Operations to define relationships in an ontology may include, for example, creating, modifying, updating, editing, or removing nodes and/or links. In some implementations, instructions tangibly embodied in an information carrier may be executed on a processor to perform portions of the method 500.

One implementation of the method 500 will be described with reference to the system 100 of FIG. 1. This is to more clearly describe the method. As such, other implementations of the method 500 may be performed by apparatus other than the system 100, and the system 100 may perform methods other than the method 500.

In this example, the operations 500 begin at step 502 with identifying language elements used together in a particular context. For example, a user may input the language elements or the language elements may be derived from another source, such as an on-line and/or electronic dictionary or thesaurus.

At step 504, a link is defined between two language elements in an ontology and, at step 506, the link is stored in an information repository. For example, the user may input the link 206 and it may be stored in the context ontology database 128.

At step 508, if additional links are to be defined, step 504 is repeated. Otherwise, at step 510, links and language elements may be updated in response to user input. For example, upon receiving the output text 132, the user may provide corrective feedback information to the user feedback module 134 and/or to the machine learning module 136. In some implementations, the machine learning module 136 may update the context ontology database 128 according to the user feedback 134, and/or according to other input signals or conditions as specified in a set of stored program control instructions.

In some implementations, the updates may occur during on-line operation as the user input is received. In other implementations, the updates may occur during off-line operations, such as during development, installation, or maintenance.

At step 512, the user feedback module 134 checks whether to continue or to terminate the method 500. If no termination signal is received, then the user feedback module 134 may repeat step 510 and continue to update context ontologies. If a termination signal is received, such as by a termination command from a user, then the method 500 ends.

In addition to the above-described examples, word recognition systems may be implemented using systems, methods, or computer program products other than the examples described above.

For example, each language element may include one more characters (e.g., letters, numbers) or symbols (e.g., "#," "$," "*", "∞", "µ", "+"), punctuation (e.g., ";", "!", "."), numbers, letters, and similar written expressions. The language elements may represent groups of characters, such as phonetic groupings (e.g., "sh," "th," or "qu"), words, phrases, sentences, paragraphs, discourses, documents, conversations, and the like. In some implementations, the language elements may be expressed in any recognizable communication language (e.g., English, Spanish, Urdu) or combination of languages. Written language elements may be expressed in a variety of combinations of capitalizations, font sizes, styles, colors, and emphases (e.g., normal, bold, underline, italic). Verbal language elements may be expressed using a variety of variable characteristics, such as pitch, speed, amplitude, and tone quality.

As another example, scores may be bounded within a range (e.g., 0 . . . 1.0, or −10 to +10) or unbounded, and may be positive and/or negative. Similarly, confidence levels that may be used to score a number of candidate language elements may include both positive and negative values. While positive confidence levels may indicate the likelihood that a language element should be converted to a particular value, negative confidence levels may indicate the likelihood that a language element should not be converted to a particular value. A scoring algorithm, which may be part of the context analyzer 126, may take into account both positive and negative type confidence levels, for example, by assigning positive and negative weights (e.g., coefficients), respectively, to the corresponding values. In this manner, a recognition module, for example, may further contribute to word recognition accuracy by providing information about both what values the language elements are likely to be and what the language elements are likely not to be.

In some implementations, one or both of the recognition modules 108, 110 may generate more than one possible value for each character in the text 102, and each value may be assigned a confidence level. In such implementations, the system 100 may resolve ambiguities by analyzing one or more of the values generated by the recognition modules 108, 110. In one implementation, for example, the system 100 may analyze all values that are assigned a confidence value that is at or above a predetermined threshold. In another implementation, the system 100 may analyze a certain number of the highest confidence threshold values, and may or may not apply a threshold.

In addition to using ontologies having links between nodes as described above, some embodiments may include reflective links, which are described in published U.S. patent application Ser. No. 10/455,780, Pub. No. 2004/0249829, filed on Jun. 5, 2003, the entire contents of which are incorporated herein by reference.

The word recognition system 100 may be implemented as a computer system that can be used with implementations of the invention.

Various implementations of the invention may be implemented in digital electronic circuitry, or in computer hardware, firmware, software, or in combinations of them. Apparatus can be implemented in a computer program product tangibly embodied in an information carrier, e.g., in a machine-readable storage device or in a propagated signal, for execution by a programmable processor; and methods can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of analog or digital data communication, including packet-based messages, on a communication network. Examples of communication networks include, e.g., a LAN, a WAN, wireless and/or optical networks, and the computers and networks forming the Internet.

The computer system may be implemented as a distributed computing system, and can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A computer-implemented method executed by a processor that performs operations for reducing ambiguities present in electronically stored words, the operations comprising:
   receiving a plurality of characters in electronic form, the received plurality of characters corresponding to a sequence of words and including an ambiguous word that has one or more characters whose value is substantially uncertain;
   comparing at least some of the words in the sequence to a first ontology, the first ontology defining a plurality of nodes, each node being associated with a word, and each node being connected to at least one other node by a link, each link being associated with a concept that relates the words associated with the nodes connected by the link in a predetermined context, wherein at least some of the nodes are associated with non-textual image information that identifies an enhancement to character-based text.

2. The method of claim 1, further comprising performing a syntactic analysis on the sequence of words to identify possible candidate words to replace the ambiguous word.

3. The method of claim 2, further comprising performing a grammatical analysis to determine which of the identified possible candidate words forms a sequence of words that conforms to a set of predefined grammatical rules when the candidate word is substituted for the ambiguous word.

4. The method of claim 1, wherein each of the uncertain characters is associated with a confidence level that is lower than a predetermined threshold.

5. The method of claim 1, further comprising selecting a word associated with one of the identified nodes to replace the ambiguous word.

6. The method of claim 5, wherein the selecting is further based on second information associated with characters or words in the sequence of words.

7. The method of claim 6, wherein the second information consists of at least one characteristic of written communication selected from among the group consisting of: font style, character size, bold, italics, or underline.

8. The method of claim 1, wherein the plurality of characters is received from an optical character recognition (OCR) device configured to convert written character image information to character information in electronic form.

9. The method of claim 1, wherein the operations further comprise:
   identifying nodes in the first ontology that correspond to the ambiguous word based on the comparison to the first ontology;
   comparing at least some of the words in the sequence to a second ontology, the second ontology defining a plurality of nodes, each node being associated with a word, and each node being connected to at least one other node by a link, each link being associated with a concept that relates the words associated with the nodes connected by the link in a predetermined context, wherein at least some of the nodes are associated with non-textual image information that identifies an enhancement to character-based text;
   identifying nodes in the second ontology that correspond to the ambiguous word based on the comparison to the second ontology;
   scoring each of the identified nodes from the first ontology and the second ontology, wherein the scoring is at least partially based upon non-textual image information that identifies an enhancement to character-based text and is associated with at least some of the identified nodes; and
   selecting a node having the highest score from among the identified nodes in the first ontology and the second ontology.

10. The method of claim 9, wherein each identified node is scored as a function of the links that connect the node and any other nodes associated with words that correspond to other words in the sequence of words.

11. The method of claim 9, further comprising replacing the ambiguous word with the word associated with the selected highest scoring node.

12. The method of claim 1, wherein the non-textual image information that identifies an enhancement to character-based text comprises font type information.

13. The method of claim 1, wherein the non-textual image information that identifies an enhancement to character-based text comprises character size information.

14. The method of claim 1, wherein the non-textual image information that identifies an enhancement to character-based text comprises boldface information.

15. The method of claim 1, wherein the non-textual image information that identifies an enhancement to character-based text comprises italics information.

16. The method of claim 1, wherein the non-textual image information that identifies an enhancement to character-based text comprises color information.

17. The method of claim 1, wherein the non-textual image enhancement to character-based text information comprises underlining information.

18. A computer program product tangibly embodied in a computer-readable data storage medium, the computer program product containing instructions that, when executed, cause a processor to perform operations to recognize words, the operations comprising:

receive a plurality of characters in electronic form, the received plurality of characters corresponding to a sequence of language elements and including an ambiguous language element that has one or more characters whose value is substantially uncertain;

perform an analysis on one or more of the language elements in the sequence of language elements according to a first ontology that defines relationships among a predetermined plurality of language elements that includes at least one of the language elements in the received plurality, at least some of the language elements in the predetermined plurality associated with non-textual image information that identifies an enhancement to character-based text.

19. The computer program product of claim 18, wherein the identified language elements comprise words.

20. The method of claim 18, wherein the operations further comprise:

perform an analysis on the one or more of the language elements in the sequence of language elements according to a second ontology that defines relationships among a predetermined plurality of language elements that includes at least one of the language elements in the received plurality, at least some of the language elements in the predetermined plurality associated with non-textual image information that identifies an enhancement to character-based text;

identify language elements in the second ontology that match the ambiguous language element based on the analysis of the second ontology;

score each of the identified language elements from the first ontology and the second ontology, wherein the scoring is at least partially based upon non-textual image information that identifies an enhancement to character-based text and is associated with at least some of the identified language elements in the predetermined plurality; and select from among the identified language elements in the first ontology and the second ontology a language element having the highest score.

21. A computer-implemented method executed by a processor that performs operations to define an ontology for use in word recognition, the operations comprising:

identifying a plurality of language elements that can be used together when a language is used to express ideas in a particular context;

defining at least one link between each language element and another of the language elements, each link indicative of a likelihood that the linked language elements will be used together to express an idea in the particular context, wherein the at least one link is associated with non-textual image information that identifies an enhancement to character-based text;

identifying an ontology for the language elements based on the non-textual image information that identifies an enhancement to character-based text; and storing the defined links in electronic form in the identified ontology within an information repository.

22. The method of claim 21, further comprising updating the ontology in response to user input.

23. The method of claim 22, wherein updating the ontology comprises adding, deleting, or modifying a link in the ontology in response to user input.

* * * * *